United States Patent [19]

Park

[11] Patent Number: 5,678,605
[45] Date of Patent: Oct. 21, 1997

[54] FLUID CONTROL VALVE SYSTEM

[76] Inventor: Young-keun Park, 17/1305, Sunkyung Apt. 450, Seongson 2-dong, Mapo-gu, Seoul, 121-252, Rep. of Korea

[21] Appl. No.: 578,687
[22] PCT Filed: Jul. 8, 1994
[86] PCT No.: PCT/KR94/00089
  § 371 Date: Jan. 3, 1996
  § 102(e) Date: Jan. 3, 1996
[87] PCT Pub. No.: WO95/02138
  PCT Pub. Date: Jan. 19, 1995

[30] Foreign Application Priority Data

Jul. 8, 1993 [KR] Rep. of Korea .................. 93-12833

[51] Int. Cl.⁶ .................................................. F16K 37/00
[52] U.S. Cl. .................................. 137/559; 251/82
[58] Field of Search .......................... 137/559; 251/82

[56] References Cited

U.S. PATENT DOCUMENTS

| | | | |
|---|---|---|---|
| 2,567,892 | 9/1951 | Osterman | 137/559 |
| 3,454,032 | 7/1969 | Hinz et al. | 251/82 |
| 3,570,533 | 3/1971 | Hamilton | 137/559 |
| 4,210,174 | 7/1980 | Eross | 137/559 |
| 5,365,967 | 11/1994 | Moore | 137/559 |
| 5,383,338 | 1/1995 | Bowsky et al. | 137/559 |

*Primary Examiner*—A. Michael Chambers
*Attorney, Agent, or Firm*—Dvorak & Orum

[57] ABSTRACT

A fluid control valve system such as a water valve is disclosed. The fluid valve includes a body including a central cavity of which the upper portion is opened, a fluid inlet and an outlet communicating with the central cavity, a cap acting as a grip for closing the central cavity of the valve body and for performing relative movement with respect to the central cavity, and an opening and closing unit which is provided in the central cavity so as to be mediated and pressed or rotated by the movement of the cap, and of which one side is contacted or contacted/separated from the inlet. Compared with the conventional fluid valve, the elements are reduced in numbers and simplified in view of designing and manufacturing thereof. Thus, the production cost is reduced. Also, in case of forming a cap which is connected with the valve body of a transparent material, the interior of the valve can be easily seen and the cleanness of the valve inside and the checking of the wear or breakage can be easily recognized.

5 Claims, 5 Drawing Sheets

FLUID CONTROL VALVE SYSTEM

TECHNICAL FIELD

The present invention relates to a fluid control valve system, and more particularly, to a fluid control tap whose structure is simplified and improved and which allows the flowing state of fluid to be observed.

BACKGROUND ART

Generally, a fluid control tap used, for instance, as a cock such as that for water or gas, functions to permit or block the flow of a fluid and to control the flow amount thereof.

A conventional fluid control tap includes (1) a main body portion for providing a space through which fluid flows, (2) a control portion having a valve which operates by a medium for controlling fluid flowing through the main body, (3) an assembly portion for coupling the control portion to the main body, and (4) a grip for operating the control portion. Since such a conventional tap includes many components and requires a positive and secure assembly between the main body and the assembly portion, and the manufacture thereof difficult and complicated. Such a tap also increases the production cost. Moreover, it is not easy for the average user to disassemble the tap for repair.

FIGS. 1 and 2 are cross-sectional views of a tap in a conventional fluid control valve system.

In this conventional fluid control tap, a body 1 hollowed such that fluid may flow therethrough and having a cylindrical portion 1c directed upward, includes an inlet 1a for receiving water from a water pipeline 2, and an outlet 1b for discharging water having passed through body 1. A first female threaded portion 1d and a first male threaded portion 1e are provided on the inner and outer circumferential surfaces of cylindrical portion 1c, respectively. A sealing cover 7 having a skirt 7a on whose inner surface a second female threaded portion 7b is formed is assembled with the first male threaded portion 1e. An operation pole 8 having a male threaded portion 8a formed on the lower outer circumferential surface thereof is connected to the first female threaded portion 1d of cylindrical portion 1c. An extended rod 8b of operation pole 8 passes through sealing cover 7 and extends on upward to be connected with a grip 3.

A valve seat 4 extended from inlet 1a and corresponding to operation pole 8 is provided inside body 1 so that a valve 6 pressed or released by operation pole 8 is located between valve seat 4 and operation pole 8. The valve is coupled to the lower portion of supporting rod 6a loosely fitted into the body of male screw portion 8a of operation pole 8. A packing 9 is interposed between cylindrical portion 1c and sealing cover 7 so as to prevent fluid leakage. Here, operation pole 8 and supporting rod 6a act as the medium enabling the operation of valve 6.

In such a water valve, being a typical and basic structure of the conventional tap, it is, however, difficult to manufacture the tap (or cock) due to the numerous necessary components and complicated interior configuration thereof, as detailed above, and the average user finds it difficult to disassemble the apparatus for any reason. Furthermore, the structure of the conventional tap as above is generally made of an opaque material such that potentially malfunctioning internal portions cannot be seen while assembled.

DISCLOSURE OF INVENTION

Therefore, in order to solve such problems, it is an object of the present invention to provide a fluid control valve system whose structure is simplified for easy manufacture and processing, repairing is facilitated, and the production cost is low.

It is another object of the present invention to provide a fluid valve system having various structures and is a high-value product, in which the flowing state of a fluid and potentially malfunctioning internal components can be seen without disassembly.

To accomplish the above object of the present invention, there is provided a fluid control valve system comprising:

a body including a cavity through which fluid flows, a fluid inlet and an outlet communicating therewith, and an opened portion communicating with the cavity;

a cap connected to the opened portion of the body in a watertight manner and connected to enable a change of a relative position while relatively moving in the form of an up-down movement, a left-right rotation movement, an up-down rotation movement, or a combination thereof with respect to the body according to an operator's manipulation; and a valve member provided in the cavity, for blocking or opening the flow of fluid and for controlling the amount of flow or mixing fluids according to the relative movement of the cap with respect to the body.

In the fluid control valve system of the present invention, the relative position of the cap and body can be varied by the relative movements such as up-down movement, left-right rotation, up-down rotation or the combination thereof in the coupling state of the cap to the body. As a specific example, the relative position movement between the body and the cap is made possible in a watertight state, while mutually corresponding screw-coupled portions are formed in the body and cap. The screw-coupled portions are formed on two cylinders each of which has a corresponding female threaded portion or male threaded portion.

For watertight security, it is preferable that a sealing member be interposed between the two cylinders. As another example of the body-cap coupling structure, the relative position movement between the body and cap is varied but the corresponding screw-coupled portions are not interposed therein. Here, in order to guarantee the watertight security, both the body and the cap may be coupled with each other via an interposed sealing member. In the present invention, differently from the conventional tap which performs the watertight function of the tap by interposing the sealing cover, the cap which also plays the role of a grip is directly involved in the watertight security.

The valve member comprises:

a valve seat provided in the cavity and communicating with the inlet;

a valve gate for blocking, permitting, mixing or controlling the flow of the fluid while staying in contact with the valve seat or by the contacting or detaching motion with the valve seat; and a medium for enabling the position of the valve gate to vary by the relative movement of the cap to the body, or for directly changing the position of the valve gate.

As a specific example, the medium, made in the form of a plate, rod, ball, column, cylinder, cone, or some combination thereof, and on one side of which the valve gate corresponding to the valve seat is provided, is able to perform a mediating motion such as a displacement movement in which the relative position of the valve gate with respect to the valve seat can be determined while performing up-down movement, left-right rotation, up-down rotation, or the combination thereof, according to the relative movement of the cap with respect to the body.

The valve gate has a structure of blocking, permitting, mixing or controlling the flow and amount of fluid while staying in contact with or contacting and detaching the valve seat, the relative position of the valve seat being varied by mediating movement of the medium and is specifically provided on one side of the medium by having a shape of plate, rod, ball, column, cylinder, cone or the combination thereof, or having a recess, a through hole, or a fluid mixing space therein, the valve provided in the middle of a flowing path of fluid and mediated by the movement of the medium to perform up-down movement, left-right rotation, up-down rotation or the combination thereof.

The valve seat has a structure of blocking/permitting the flow of the fluid to the outlet, controlling the amount of fluid flow, or mixing fluids at the state of being kept in contact with or contacted and/or separated from the valve and specifically provided in the middle of the fluid flow path of the cavity, and having a shape corresponding to the valve.

BRIEF DESCRIPTION OF DRAWINGS

The above objects and advantages of the present invention will become more apparent by describing in detail a preferred embodiment thereof with reference to the attached drawings in which.

BEST MODE FOR CARRYING OUT THE INVENTION

Figure 3:
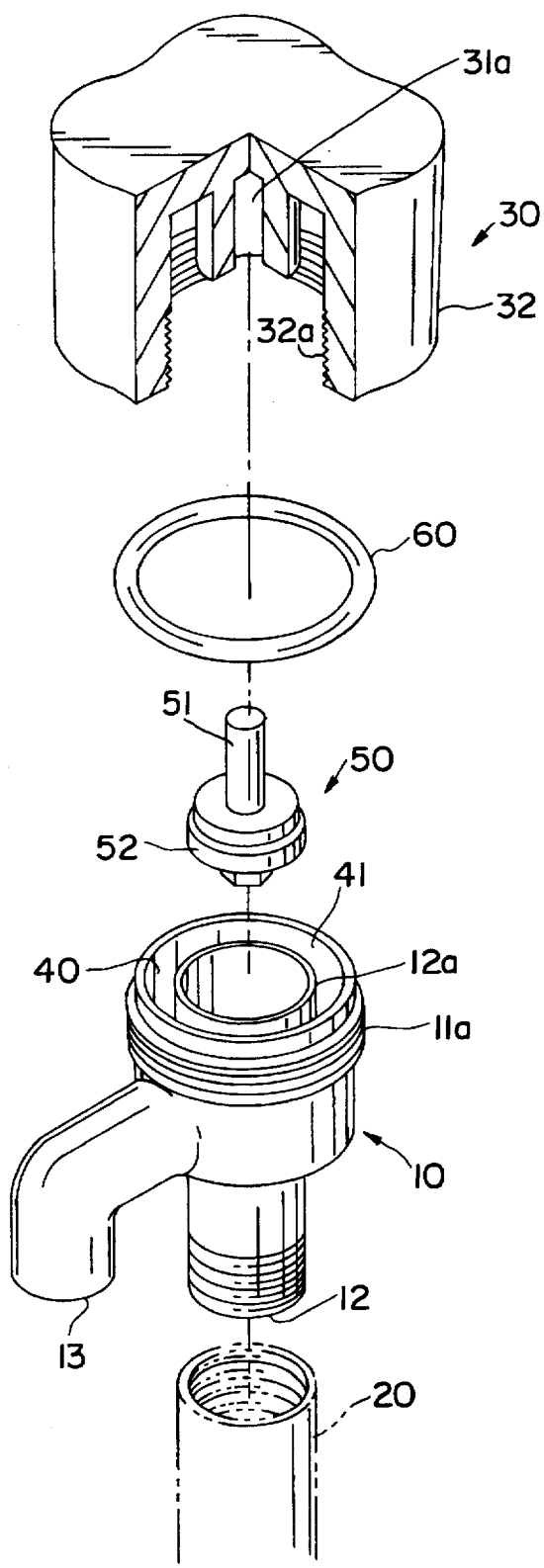
FIG. 3 is an exploded perspective view of a fluid control tap according to the present invention.
Figure 4:
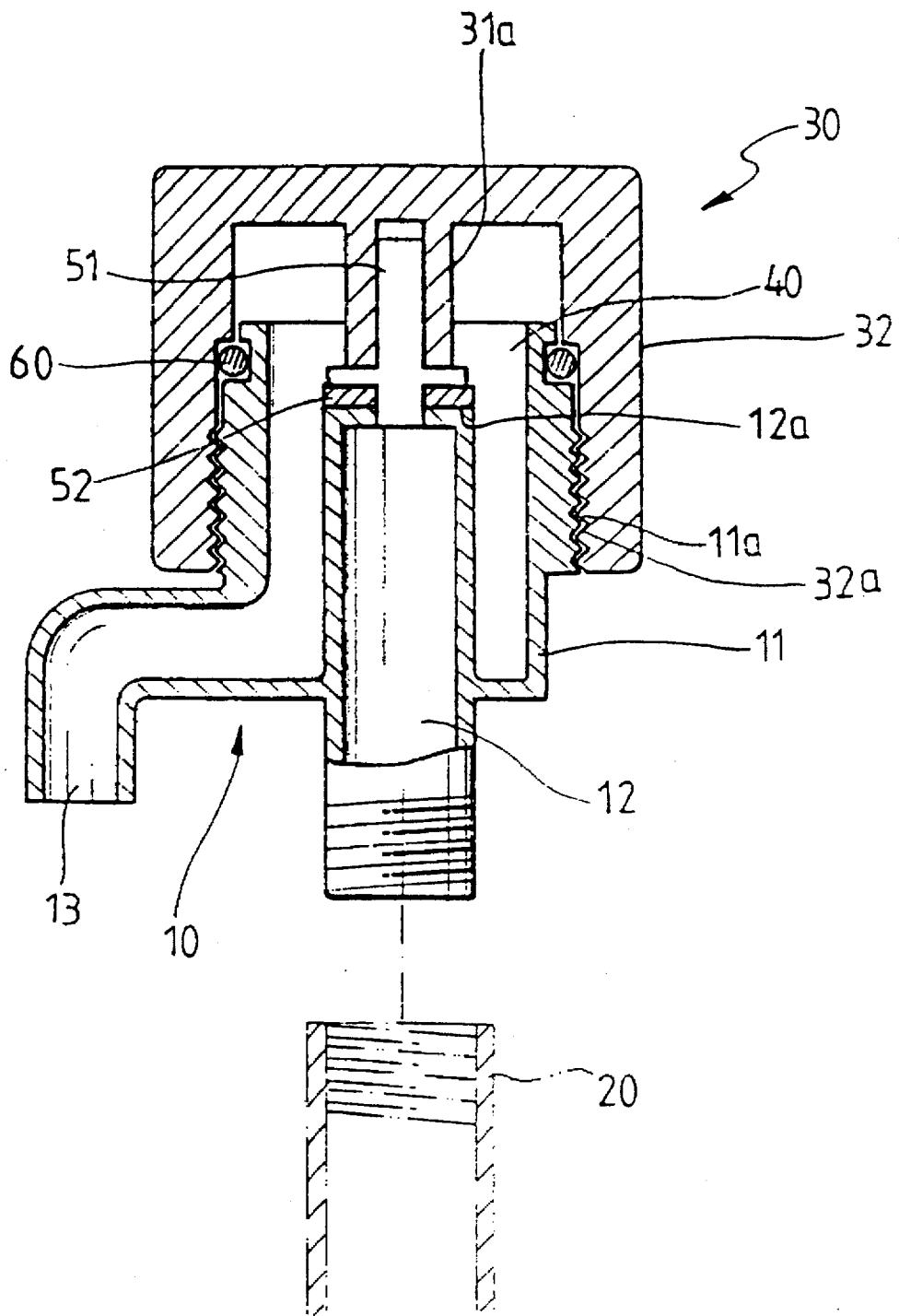
FIG. 4 is a partially cutaway, sectional view of the fluid control tap according to the present invention shown in FIG. 3.

Referring to FIGS. 3 and 4, a preferred embodiment of the fluid control tap of the present invention comprises a cylindrical body 10 having both a cavity 40 being a path through which fluid flows between its inlet 12 and outlet 13 and an opened portion 41 communicating with cavity 40 and opened outside, a cap 30 screw-coupled to body 10 for relative movement in a state where opened portion 41 is closed to suppress the leakage of the fluid, and a valve member 50 located in the middle of the fluid flowing path. Male threads 11a are formed on the outer circumferential surface of body 10, with female threads 32a correspondingly formed on the inner circumferential surface of skirt 32 of cap 30. For a watertight seal between body 10 and cap 30, a sealing member 60 is interposed between the inner circumferential surface of skirt 32 of cap 30 and the outer circumferential surface of opened portion 41 of body 10.

The valve member is made up of a valve seat 12a provided in the cavity 40, a valve gate 52 contacting or being detached from the valve seat for blocking/opening the flowing path of fluid into cavity 40 so as to control the amount of flow, and a rod 51 acting as the operating medium and inserted into a supporting tube 31a provided inside cap 30 for supporting the rod.

Although, in the above structure, it is explained that the skirt 32 of cap 30 is formed surrounding the exterior of body 10, the skirt 32 of cap 30 may enter the cavity 40 inside body 10, with the male threads being formed on the outer circumferential surface of skirt 32 and the corresponding female threads being formed on the inner circumferential surface of cavity 40. In this structure, sealing member 60 is interposed between the outer circumferential surface of skirt 32 of cap 30 and the inner circumferential surface of opened portion 41 of body 10.

The above-described structure of fluid control tap different from the conventional one is characterized in that opening portion 41 of the body is closed by cap 30 acting as a grip so that cavity 40 is isolated from outside and that valve member 50 is operated by the rotation of the cap, to thereby enable the cap 30 to be directly involved in the watertight security.

Further, the fluid control tap of the present invention has a simplified structure as compared with the conventional one. Especially, all or part of the cap may be formed of a transparent material so that the cavity can be viewed from the outside.

Figure 1:
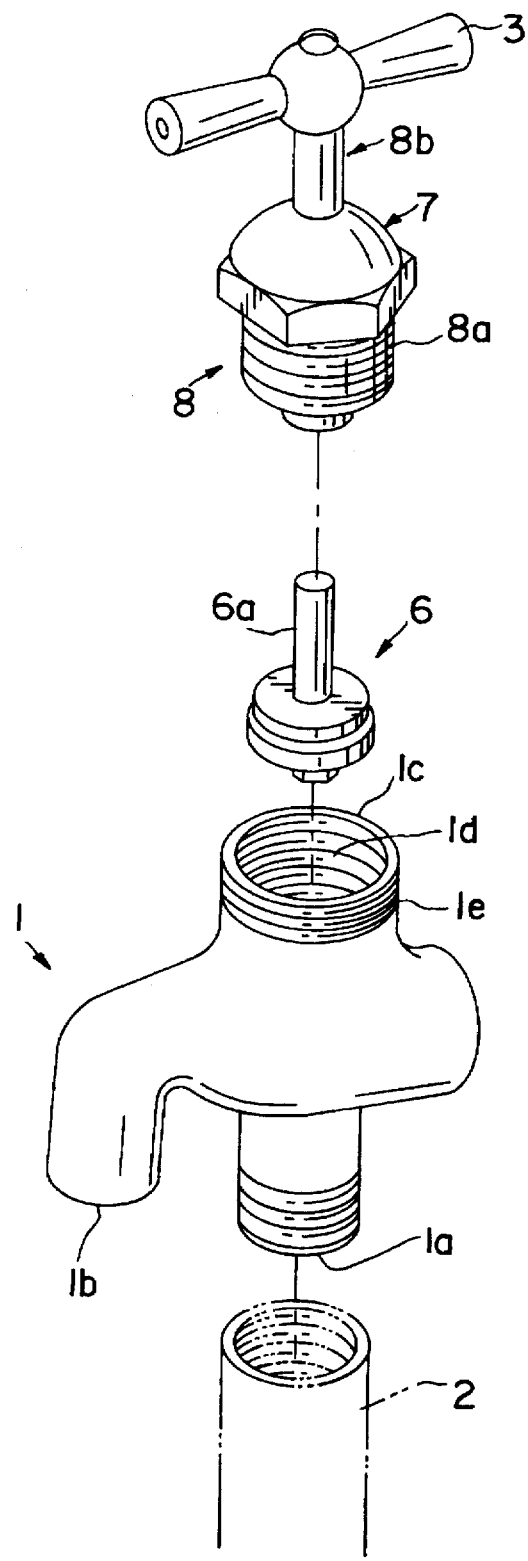
FIG. 1 is an exploded perspective view of a conventional tap.
Figure 2:
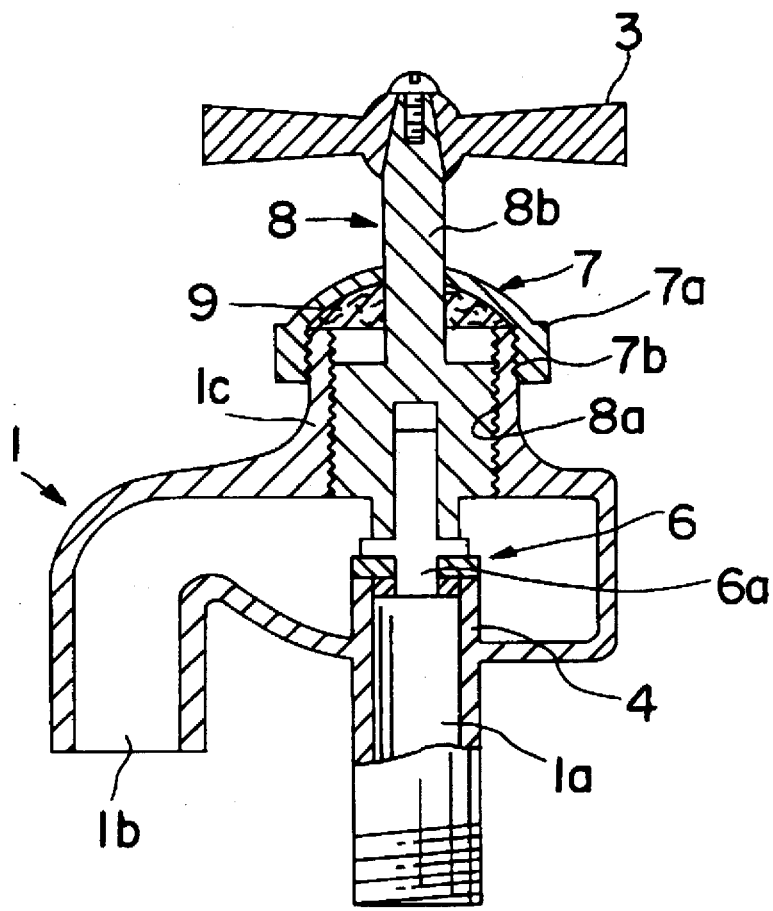
FIG. 2 is a partially cutaway, sectional view of the conventional tap of FIG. 1.
Figure 2:
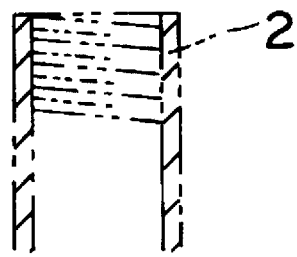

Such a tap (cock) of the present invention can be formed differently from the above embodiment or improved as a further developed structure, on the basis of the fundamental idea of the present invention. It is for the same reason that the conventional screw-coupled tap, up-down operating lever grip tap, left-right operating lever grip tap, cool-hot water mixing tap, and other taps have been modified and developed on the basis of the essential idea of FIG. 1. Here, although targets of modification may be considered in the wide range, they are confined to the valve member and the connection of the cap with the body in this embodiment for the convenience of explanation. The two targets to be modified can be changed individually or in association.

As the cap rotates left and right or up and down with respect to the body, the cap may rotate simply with respect to the body, or the cap may rotate relatively thereto involving the change of relative position due to distance movement. Correspondingly, the interlocking structure of the valve member, that is, the structure of a medium and the valve gate, is appropriately changed in the form of rod, column, cylinder, cone, ball or sphere. The embodiment of FIGS. 3 and 4 is an example of very simple structure of the relatively rotating cap. The embodiment is designed to block fluid or to control the amount of flow thereof, by pressing or contacting/detaching the valve gate from the valve seat as both the body and the cap operate in the combination of the relative rotation and up-down movement of position by the mutual screw connection. In another case, the flow of the fluid can be blocked or opened and the amount of fluid can be controlled, by keeping the valve gate pressed and in contact with the valve seat. This can be also accomplished by simply having the cap and body relatively rotate to the left and right or up and down, as in the simply rotating cap.

There is also a case when the cap performs a complex relative movement in which the cap is able to rotate left and right, simultaneously pivot up and down and has a relative distance movement with respect to the body. This case is frequently used for a tap for blocking/opening or mixing different fluids, e.g., hot water and cool water, or controlling the flow amount thereof. This modification, whether a simple form or incorporating an additional fluid mixing/controlling valve, is well-known in the art, and some of its basic technical ideas adaptable in the present invention will be briefly explained.

Figure 5A:
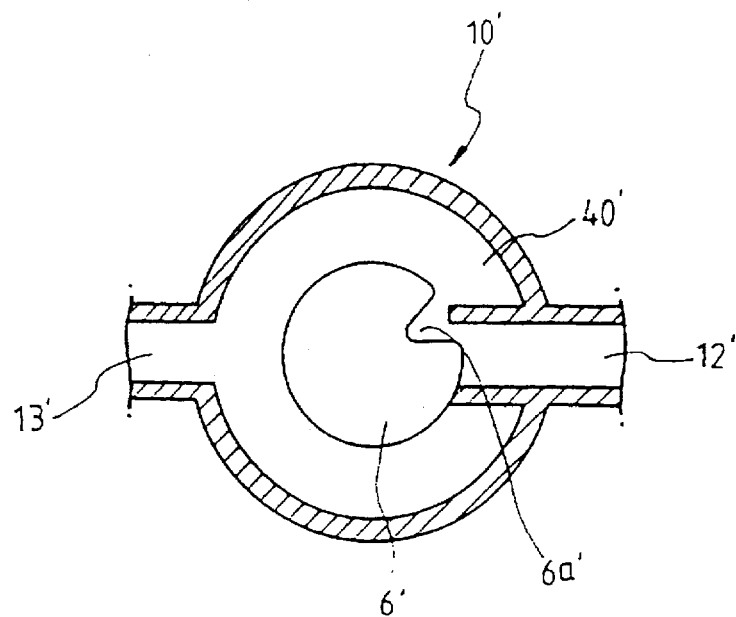
FIGS. 5A and 5B are cross-sectional views of another embodiment of the present invention.
Figure 5B:
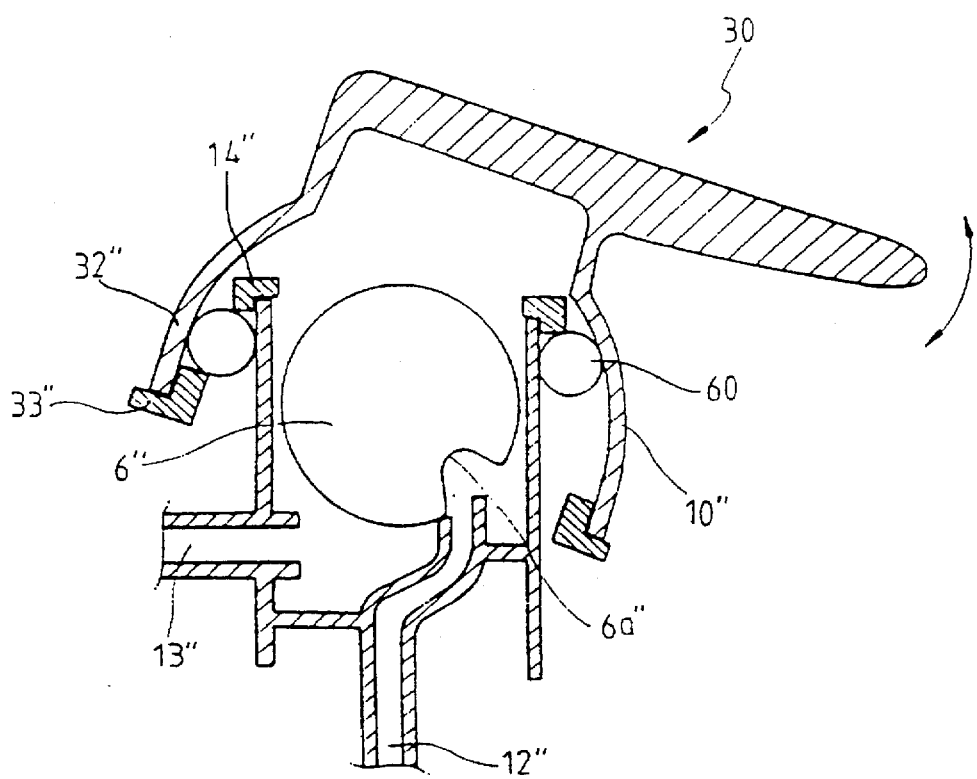

FIGS. 5A and 5B illustrate another embodiment of the present invention having a modified valve member. Referring to FIGS. 5A and 5B, a cavity 40' or 40" is disposed between an inlet 12' or 12" and an outlet 13' or 13". Valve gate 6' or 6", rotated by the movement of the cap and the mediation of the medium and made in a shape of column, cylinder, cone or ball, is placed closely adjacent to the valve seat on the side of inlet 12' or 12" so that the inflow of the fluid is blocked. Recess 6a' or 6a", provided on one side of the valve, is appropriately situated with respect to the valve seat so as to permit and control the inflow of the fluid. Also, FIG. 5B illustrates another embodiment in which the coupling of the cap and the body of the valve is modified. In this case, the inner surface of skirt 32" of cap 30 has a form of a spherical surface for its left-right and up-down free movement. Sealing members 60 are provided between body 10" and cap 30. A separation-preventing members 14" and 33" are placed at the end of skirt 32" and at the end of body 10", respectively.

The shape, position and direction of the inlet and outlet can be varied. The valve gate can also be varied in connection with the valve seat, by providing a through hole instead of the recess, providing a space in which different fluids are mixed thereinside, or by having fluid flowing through the valve gate toward the outlet and not via the cavity of the body.

Although the above-discussed embodiments are described with a structure having one inlet and one outlet, they can be applied to a structure having more than one inlet and outlet, respectively. In a structure having a plurality of inlets and/or outlets and using one cap, a plurality of the inlets and/or outlets may share one valve seat. In a structure wherein a plurality of caps are used, the inlets may correspond to respective caps, or the respective caps may also share one cavity in common. Other variations are also possible.

As described above, various modifications of the present invention are practicable without limiting the scope of the present invention. Any modification containing the basic idea of the present invention, in which the cavity is closed with a cap serving as a grip and the flow of fluid is blocked/permitted or controlled by the relative movement of the cap to the body, belong to the present invention.

What is claimed is:

1. A fluid control valve comprising:

a generally cylindrical body having an outer circumferential surface that defines a cavity and an open portion of said body through which a fluid flows, a fluid inlet opposite said open end and integral with said valve body, said fluid inlet in communication with said cavity and said open portion, a fluid outlet in communication with said open portion and each other through said cavity, said outer surface of said cylindrically-shaped body delimiting said opened portion;

a cap movably connected in a continuous operative fashion to said opened portion of said body, said cap closing said open portion in a watertight manner and movable in a form selected from the group consisting of an up-down movement, a left-right rotational movement, an up-down rotational movement, and a combination thereof, said movement occurring relative to said body and in accordance to an operator's manipulation of said cap; and a valve member provided in said cavity for controlling the flow of fluid through said valve according to the relative movement of said cap with respect to said valve body, said valve member comprised of a valve gate and a medium for changing a position of said valve gate relative to said valve seat by direct movement of the cap with respect to the body, said medium connected to said cap on one end and to said gate on another end, said gate communicating with said seat of said valve inlet, said valve member controlling the flow of the fluid by one of remaining in contact with the valve seat and by detaching itself from the valve seat upon direct manipulative movement of the cap with respect to the body so as to block, permit, and mix the flow of the fluid through the valve body.

2. The fluid control valve as claimed in claim 1, wherein said cap is made of a transparent material.

3. The fluid control valve as claimed in claim 1, wherein said valve gate is a form selected from the group consisting of a plate, a rod, a ball, a column, a cylinder, a cone, and a combination thereof.

4. The fluid control valve as claimed in claim 3, wherein said valve gate further includes one of a recess, a through hole, and a fluid mixing space therein, and is provided in a middle of a flowing path of the fluid.

5. The fluid control valve as claimed in claim 3, wherein said valve seat has a shape corresponding to the valve gate so as to block the flow of the fluid while in contact with the valve gate and to permit the flow of the fluid in a controlled manner while said valve gate is being separated from said valve seat.

* * * * *